June 1, 1965      S. SYLVAN      3,186,389
ROTARY FILTER APPARATUS
Filed May 18, 1962
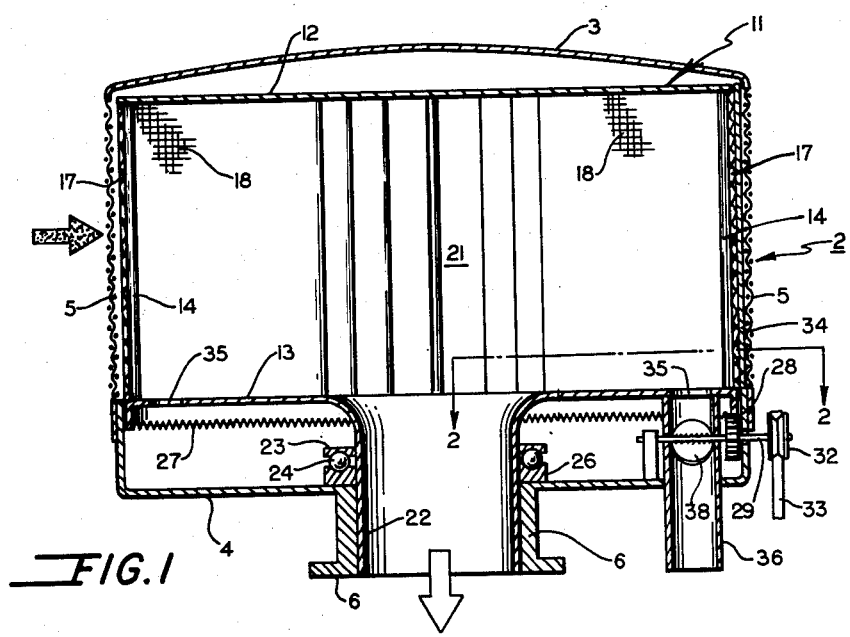
FIG.1
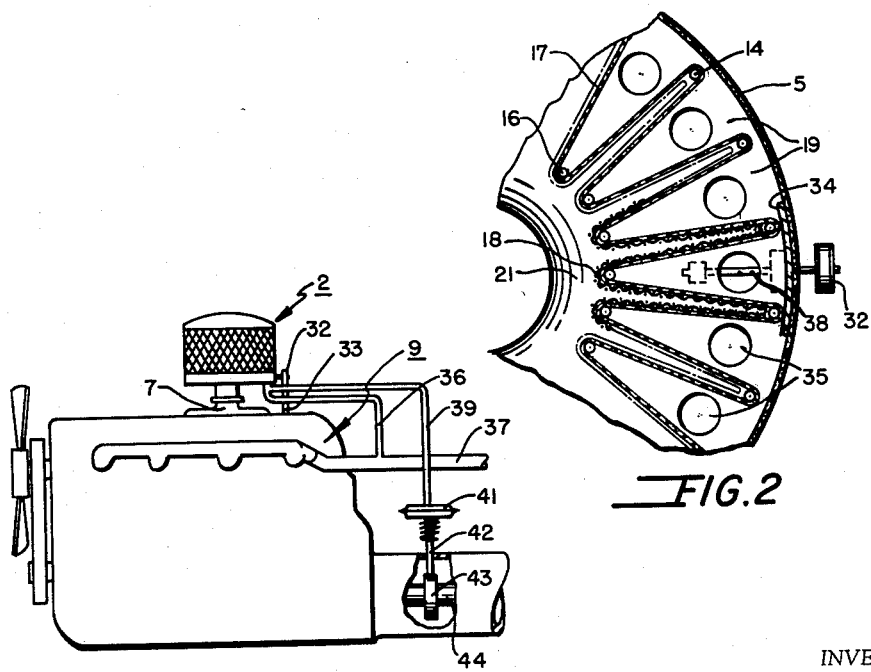
FIG.2
FIG.3
INVENTOR.
STIG SYLVAN
BY
Ralph B. Quick
ATTORNEY

United States Patent Office 3,186,389
Patented June 1, 1965

3,186,389
ROTARY FILTER APPARATUS
Stig Sylvan, Louisville, Ky., assignor to American Air Filter Company, Inc., Louisville, Ky., a corporation of Delaware
Filed May 18, 1962, Ser. No. 195,775
4 Claims. (Cl. 123—119)

The present invention relates to apparatus for separating contaminant particles from a dirty gas stream and more particularly to novel rotary filter apparatus for continuously separating out contaminant particles from an air stream introduced into the intake manifold of an internal combustion engine.

In accordance with the present invention, a novel filter apparatus is provided which is economical to manufacture and assemble and which is efficient in its operation, utilizing power derived from the mechanism which it serves. In addition, the present invention provides a continuous filter apparatus which affords maximum filter area in a given space and which is maintainable in such continuous operation over extended periods of time through efficiently operated reverse cleaning mecahnism that also utilizes power derived from the mechanism which the filter apparatus serves.

Various other features of the present invention will become obvious to one skilled in the art upon reading the disclosure set forth herein.

More particularly, the present invention provides a continuous rotary filter for separating contaminant particles from a dirty gas stream comprising: a rotatably mounted filter drum including spaced end plates having a gas permeable filter medium sheet connected thereto and extending therebetween in pleated endless fashion to define a plurality of dirty gas upstream pockets between adjacent pleats and a downstream clean gas plenum; a clean gas outlet communicably connected to the clean gas plenum of the filter drum; drive means to rotate the filter drum; dirty gas seal plate means extending adjacent the crests of the pleated filter medium, the seal plate means being of sufficient area to seal off successive upstream pockets for preselected periods of time as the filter drum is rotated; and reverse air cleaning means communicably connected to the pockets to place the pockets under vacuum as they are sealed off to remove contaminant particles collected on the wall of the pockets. The present invention further provides a novel means for rotating the filter drum by connecting it to the engine which it serves and a novel means for providing the reverse air cleaning means from the engine which the filter drum serves.

It is to be understood that various changes can be made in the arrangement, form and construction of the apparatus described herein without departing from the scope or spirit of the present invention.

Referring to the drawings which disclose one advantageous embodiment of the present invention:

FIGURE 1 is a cross-sectional elevational view of the inventive rotary filter apparatus;

FIGURE 2 is a cross-sectional plan view of a portion of the apparatus of FIGURE 1 taken in a plane passing through line 2—2 of FIGURE 1; and, FIGURE 3 is a partially broken-away reduced elevational view of an internal combustion engine with a rotary filter drum like that of FIGURES 1 and 2 mounted thereon, the filter drum of FIGURE 3 having a modified pulsing arrangement for the reverse cleaning system.

As can be seen in FIGURE 1 of the drawing, filter drum housing 2 is disclosed as including top plate 3, spaced bottom plate 4, and peripheral gas pervious cylindrical screen 5 fastened to and extending between top and bottom plates 3 and 4, respectively. It is to be noted that bottom plate 4 is provided with centrally disposed collar portion 6. As can be seen in FIGURE 3, collar portion 6 is adapted to be mounted on an air intake 7 of an internal combustion engine 9.

Disposed within housing 2 for rotational movement therein is filter drum 11. Filter drum 11 includes horizontally extending upper and lower circular end plates 12 and 13, respectively, the plates being held together in spaced relationship from each other by vertically extending outer and inner sets of spaced rods 14 and 16, respectively. Positioned in pleated endless fashion about rods 14 and 16 is a sheet of woven or felted, gas permeable, filter medium 17. A suitable gas permeable, back-up screen 18 can be provided to support filter medium 17 during gas cleaning operations, the edges of the filter medium 17 and the back-up screen 18 being fixed to the end plates by means of a suitable cement or adhesive to avoid gas bypass.

It is to be noted that the outer wall of the pleated sheet of filter medium 17 serves to define with spaced end plates 12 and 13 a plurality of dirty gas upstream pockets 19 between adjacent radially extending pleats. The inner wall of the filter medium 17 serves to define with the spaced end plates a downstream clean air plenum 21. It also is to be noted that lower end plate 13 is formed to include a centrally disposed collar portion 22 which is arranged to project into collar 6 of housing 2. Collar portion 22 serves as a clean air outlet conduit to connect clean air plenum 21 with air intake 7 of engine 9 when drum 11 is mounted on engine 9. Collar 22 has fixed thereto upper race 23 for ballbearings 24. Lower race 26 for the ballbearings 24 is fixed to rest on bottom plate member 4 of housing 2 about portion 22. With this arrangement, the entire filter drum assembly 11, in effect, rests on ballbearing members 24 for rotational movement in housing 2.

To impart the desired rotational movement to filter drum 11, the peripheral edge of circular end plate 13 is formed into a gear train 27. Gear train 27 engages and is actuated through pinion 28 fixed to shaft 29 that is rotatably supported on suitable bearing members on plate member 4. A sheave 32 mounted at one end of the rotatably supported shaft 29 is arranged to be driven through belt 33 which can be connected to one of the driven shafts of engine 9.

As filter drum 11 is driven through the aforedescribed drive arrangement, upstream pockets 19 formed by pleated filter medium 17 successively rotate past seal plate member 34 fixed to and extending between top plate member 3 and bottom plate member 4 of housing 2. Seal plate member 34 is so positioned relative filter drum 11 that crests of adjacent pleats of filter medium 17 engage against the plate 34 in sealing relationship therewith to seal off a pocket member 19 from the air stream which would otherwise pass into the pocket member and through the pocket forming walls of adjacent pleats. It is to be noted that the length of time a pocket remains sealed is determined by the breadth of seal plate 34 and the rate of rotational movement of filter drum 11 and that such time period can be varied in accordance with the results desired.

In order that each pocket member 19 of filter drum 11 can be communicably connected to a reverse air system when sealed off by plate member 34, lower plate member 13 of filter drum 11 is provided with a plurality of spaced apertures 35 so arranged that each aperture communicates with one of the several pocket members 19. A conduit 36 having one end communicably connected to exhaust manifold 37 of engine 9 is arranged to extend through bottom plate 4 of housing 2 so as to communicate successively with apertures 35 and thus with their associated pocket members 19 as such pocket members are sealed off by plate member 34.

As disclosed in FIGURE 1 of the drawing, the drive assembly for gear train 27 can be so positioned in housing 2 that shaft 29 of the drive assembly passes through conduit 36 so as to rotate a pulsing valve 38 fixed to the shaft. Alternatively, as can be seen in FIGURE 3, a second conduit 39 can be provided, connected at one end to conduit 36 adjacent filter drum housing 2, the opposite end of conduit 39 being connected to one side of an air pressure diaphragm 41. On the opposite side of air pressure diaphragm 41 an actuating rod 42 can be provided, such rod being spring urged against cam 43 mounted on engine drive shaft 44. Accordingly, when engine drive shaft 44 is rotated, actuating rod 42 is reciprocated and the motion thereof is translated as a pulsing action to conduit 36 through diaphragm 41 and conduit 39.

In a typical operation of the apparatus described, as internal combustion engine 9 operates, the motion of a shaft on the engine is translated through belt 33, sheave 32, shaft 29, and pinion 28 to gear train 27 of rotary filter drum 11. As drum 11 rotates, air is drawn through the pleats of filter medium 17 so that contaminant particles are filtered out. The cleaned air passes into clean air plenum 21 and into the air intake 7 of engine 9. As the upstream pockets 19 formed by the pleats successively pass seal plate member 34, they are sealed off for a brief period of time and placed under a reverse air stream induced through exhaust manifold 37 to which they are connected through conduit 36. This reverse air stream re-entrains contaminants that have collected on filter medium 17 to thus clean the medium continuously for further use, the pulsing of the air stream created by pulsing valve 38 or through the air diaphragm arrangement 41 serving to enhance the cleaning efficiency by fluttering the filter medium.

The invention claimed is:

1. A continuous rotary filter for separating contaminant particles from a dirty gas stream comprising:
  (a) a rotatably mounted filter drum including spaced end plates having a gas permeable filter medium sheet connected thereto and extending therebetween in pleated endless fashion to define a plurality of dirty gas upstream pockets between adjacent pleats and a downstream clean gas plenum;
  (b) a clean gas outlet communicably connected to said clean gas plenum of said filter drum;
  (c) drive means to rotate said filter drum;
  (d) dirty gas seal means extending adjacent the crests of said pleated filter medium, said seal means being of sufficient area to successively seal off said upstream pockets for preselected periods of time as said filter drum is rotated; and
  (e) reverse air cleaning means communicably connected directly to said upstream pockets as said pockets are sealed off to remove contaminant particles collected on the walls of said pockets, said reverse air cleaning means including a plurality of spaced apertures disposed in a circular manner adjacent the peripheral edge of one of said end plates, each aperture being in communication with one of said dirty gas upstream pockets, and a reverse air conduit means positioned adjacent said apertured end plate to communicate with said pockets through said apertures as said apertures are passed over said conduit means.

2. The apparatus of claim 1, said reverse air conduit means including pulsing means to pulse said reverse air stream and increase contaminant removal efficiency.

3. In a system for supplying clean air to the intake manifold of an internal combustion engine, a continuous rotary air filter for separating contaminant particles from the air stream introduced into said intake manifold comprising:
  (a) a filter drum rotatably mounted on said engine and including spaced end plates having an air stream permeable filter medium sheet connected thereto and extending therebetween in pleated endless fashion to define a plurality of dirty air upstream pockets between adjacent pleats and a downstream clean air plenum;
  (b) a clean air outlet conduit communicably connecting said clean air plenum of said filter drum with the air intake of said engine;
  (c) means connecting a driven shaft of said engine with said filter drum to rotate said drum;
  (d) dirty air stream seal plate means extending adjacent the crests of said pleated filter medium, said seal plate means being of sufficient area to successively seal off said upstream pockets for preselected periods of time as said filter drum is rotated; and
  (e) reverse air cleaning means including conduit means communicably connecting said upstream pockets directly to said exhaust manifold of said engine to place said pockets under a reverse air stream when they are sealed off removing contaminant particles collected on the walls of said pockets;
  (f) said conduit means including pulsing means to pulsate said reverse air stream and increase contaminant removal efficiency, said pulsing means being connected to said means for rotating said drum to be actuated in a pulsing manner as said drum is rotated.

4. The apparatus of claim 3, said pulsing means comprising an air pressure diaphragm communicably connected to said conduit means, said diaphragm being actuated through a drive shaft of said engine.

References Cited by the Examiner

UNITED STATES PATENTS

| 251,120 | 12/81 | Kirk | 55—317 |
|---|---|---|---|
| 252,144 | 1/82 | Russell | 55—290 |
| 273,533 | 3/83 | Holt | 55—290 |
| 1,043,551 | 11/12 | Thurman | 55—290 |
| 1,397,001 | 11/21 | Garner | 55—351 |
| 1,493,789 | 5/24 | Mullen | 55—351 X |
| 1,962,425 | 10/33 | Carlson | 55—317 X |
| 2,315,278 | 3/43 | Shaw | 55—351 X |
| 2,420,822 | 5/47 | Hallwood | 55—302 X |
| 2,473,501 | 6/49 | Bahnson | 55—351 X |
| 2,661,810 | 12/53 | Heth | 55—301 |
| 2,732,912 | 1/56 | Young | 55—290 |
| 2,795,291 | 6/57 | Pierce | 55—351 X |
| 2,823,656 | 2/58 | Dolza | 55—302 |
| 2,954,873 | 10/60 | Davis | 55—302 X |
| 3,000,507 | 9/61 | Young | 55—302 |

OTHER REFERENCES

Siemens: German application No. 1,017,347, printed 11/54, Kl. 34c, 5/60.

Standart FiHerbau: German application 1,131,074, printed 6/54, Kl. 50e 5/10.

REUBEN FRIEDMAN, *Primary Examiner.*